(12) United States Patent
Greiner et al.

(10) Patent No.: US 8,412,802 B2
(45) Date of Patent: Apr. 2, 2013

(54) SYSTEM AND METHOD TO OPTIMIZE DATA COMMUNICATION IN A COMPUTATIONAL NETWORK

(75) Inventors: Hans-Jurgen Greiner, Phoenix, AZ (US); Mike Rice, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 602 days.

(21) Appl. No.: 12/369,416

(22) Filed: Feb. 11, 2009

(65) Prior Publication Data
US 2010/0205239 A1 Aug. 12, 2010

(51) Int. Cl.
G06F 15/16 (2006.01)

(52) U.S. Cl. .................. 709/219; 380/217

(58) Field of Classification Search .......... 709/219, 709/229; 713/156, 155; 380/258, 217; 455/411
See application file for complete search history.

(56) References Cited

U.S. PATENT DOCUMENTS

| | | | |
|---|---|---|---|
| 6,199,065 B1 * | 3/2001 | Kenyon | 1/1 |
| 6,604,106 B1 | 8/2003 | Bodin et al. | |
| 6,751,651 B2 | 6/2004 | Crockett | |
| 6,883,137 B1 | 4/2005 | Girardot et al. | |
| 6,963,930 B2 | 11/2005 | Halpert et al. | |
| 7,028,262 B2 | 4/2006 | Estrada et al. | |
| 7,139,976 B2 | 11/2006 | Kausik et al. | |
| 7,152,203 B2 | 12/2006 | Gao et al. | |
| 7,174,544 B2 | 2/2007 | Zee | |
| 7,188,312 B2 | 3/2007 | Hsiu-Ping et al. | |
| 7,278,109 B2 | 10/2007 | Shalabi et al. | |
| 7,376,653 B2 | 5/2008 | Hart, III | |
| 7,415,665 B2 | 8/2008 | Kreiner et al. | |
| 7,428,752 B2 | 9/2008 | Rutherglen et al. | |
| 7,437,438 B2 * | 10/2008 | Mogul et al. | 709/223 |
| 8,108,488 B2 * | 1/2012 | Derechin et al. | 709/219 |
| 2003/0147350 A1 | 8/2003 | Wookey et al. | |
| 2005/0034099 A1 * | 2/2005 | Spooner | 717/104 |
| 2006/0067219 A1 | 3/2006 | Dougall et al. | |
| 2006/0236847 A1 * | 10/2006 | Withop | 84/612 |
| 2008/0004904 A1 * | 1/2008 | Tran | 705/2 |
| 2008/0271045 A1 * | 10/2008 | Le Roy et al. | 719/311 |
| 2008/0316922 A1 | 12/2008 | Riddle et al. | |
| 2010/0161717 A1 * | 6/2010 | Albrecht et al. | 709/203 |
| 2011/0314129 A1 * | 12/2011 | Rezaiifar et al. | 709/218 |

OTHER PUBLICATIONS

Bundling Web Objects for More Efficient Content Delivery 05 Craig E. Wills, Computer Science Dept., Worcester Polytechnic Institute, Worcester, MA 01609 USA Mikhail Mikhailov and Hao Shang: Hao Shang: Computer Science Dept., Worcester Polytechnic Institute; Worcester, MA 01609 USA (May 2001).*
Notification of International Search Report and the Written Opinion dated Mar. 10, 2010 for No. PCT/US2010/22698.
PCT; International Preliminary Report on Patentability dated Apr. 13, 2011 in Application No. PCT/US2010/022698.

* cited by examiner

Primary Examiner — Tauqir Hussain
(74) Attorney, Agent, or Firm — Snell & Wilmer L.L.P.

(57) ABSTRACT

A system and method for data communication in a computational network is disclosed. The computational network includes a server computational device and a client computational device. The server computational device stores one or more container data objects, and a container data object includes a reference to multiple external data objects. The client computational device retrieves a container data object from the server computational device. If the container data object includes a reference to multiple external data objects, the client computational device sends a request to the server computational device. The server computational device provides a response including the multiple external data objects.

20 Claims, 9 Drawing Sheets

```
<HTML>

<HEAD>

<TITLE> Welcome to Company ABC </TITLE>

<!-- External CSS Files -->

<link href="css/home.css" rel="stylesheet" type="text/css" />
    <link href="css/generic.css" rel="stylesheet" type="text/css" />
    <link href="css/navigation.css" rel="stylesheet" type="text/css" />

<!-- External JavaScript Files -->

<script type="text/javascript" src="js/prototype.js"></script>
    <script type="text/javascript" src="js/reflection.js"></script>
    <script type="text/javascript" src="js/login.js"></script>

</HEAD>

<BODY>

<!-- The elements in the body of the HTML file are included here. -->

</BODY>

</HTML>
```

400

402 (CSS files)

404 (JavaScript files)

FIG. 4A – PRIOR ART

```
<HTML>
  <HEAD>
    <TITLE> Welcome to Company ABC </TITLE>
    <!-- External CSS Files -->
    <link rel="stylesheet" type="text/css" href="CompressCacheServlet?file=css/home.css,   ⎫
    css/generic.css, css/navigation.css&filetype=text/css"/>                                ⎬ 406
                                                                                            ⎭
    <!-- External JavaScript Files -->
    <script type="text/javascript" src="compressCacheServlet?file=s/ prototype.js,   ⎫
    js/ reflection.js, js/login.js&filetype=js"></script>                             ⎬ 408
                                                                                      ⎭
  </HEAD>
  <BODY>
    <!-- The elements in the body of the HTML file are included here. -->
  </BODY>
</HTML>
```

FIG. 4B

SYSTEM AND METHOD TO OPTIMIZE DATA COMMUNICATION IN A COMPUTATIONAL NETWORK

FIELD OF INVENTION

The present invention generally relates to data communication in a computational network, and more specifically, to the optimization of data communication in a client-server architecture-based computational network.

BACKGROUND OF THE INVENTION

A web page is an electronic document created using a mark-up language, such as hypertext markup language (HTML) that is part of a group of Hypertext documents available on the World Wide Web. A web page includes a perceived information set, which is rendered by a web browser. The web page further includes an internal information set, which includes information that facilitates rendering of the web page and information that provides a set of functionalities to the web page. It is possible to store a part of the perceived and internal information sets in one or more files other than the web page ("external files"). When a part of the perceived information sets and internal information sets is stored in one or more external files, the web page includes references to such external files.

A web browser is a software application, which runs on a web client, and retrieves a web page located on the web server and renders the web page for display to an end user. During the rendering process, the web browser parses the web page to determine whether one or more external files are referenced in the web page. If an external file is referenced in the web page, the web browser sends a request to the web server and the web server provides a response including the requested external file. The request from the web browser and the response from the web server are communicated in accordance with a standard data transfer protocol, such as Hypertext Transfer Protocol (HTTP). This process is repeated for each external file referenced in the web page.

The web browser may not begin the display of the web page until acquisition of all the external files is completed. For example, if the external files include information related to style, which is to be applied to the entire web page, the web page is not displayed until all the external files are received. The time elapsed between the instant a web browser initiates a request for a web page and the instant a web page is completely displayed in the web browser is referred to as web page response time or latency. It is apparent that an increase in the number of external files referenced in a web page undesirably increases the web page latency.

In some cases, it is not possible to include all the desired information in a web page and hence, the information is stored in one or more external files, which are referenced in the web page. In certain other cases, (e.g., information related to style and scripts), it is a matter of design optimization that governs whether the information is to be in-lined (i.e. included) in the web page or defined in one or more external files.

The web pages may be designed to provide consistent user interface screens by including a reference to a style sheet. A style sheet, such as a cascading style sheet (CSS), specifies the presentation of each user interface element during the rendering process. Similarly, the web pages may provide a common functionality by including a reference to a script. A script is a program code defined using an interpreted scripting language, such as JavaScript. The style sheets and the scripts may be in-lined in the web page. In an embodiment, style sheets and scripts may be defined in external files and included by reference in the web page.

The style sheets and the scripts in-lined in the web page get downloaded every time the web page is requested. Although this approach does not increase the number of HTTP requests from the web browser to render the web page, this approach increases the size of the web page and hence, creates network bandwidth overheads. Further, this approach leads to several problems in code maintenance and change management.

The use of external files (e.g., style sheets and scripts), offers several advantages from a programming and design perspective. It facilitates a modular design approach that provides a distinction between, content, functionality, and appearance. The modular design leads to reusability of code, facile testing and debugging, easier maintenance, and effective change management. Further, the external files may be stored in the web browser cache for future use. Thus, the external files may be locally retrieved from the web browser cache instead of remotely retrieving the external files from the web server. However, in case the external files referenced in a web page are not stored in the web browser cache, each external file is individually retrieved from the web server.

The HTTP/1.1 specification mentions that a web browser should not download more than two components in parallel per hostname. Due to this limitation in the specification, a web browser is usually prevented from initiating parallel downloads for the external files; and at best, a web browser initiates download of only two external files in parallel. Thus, for each external file, the web browser sends an HTTP request to the web server, then waits for the request to reach the web server, the web server to process the request, and the response (including the file content itself) to reach the web browser, before requesting another external file.

It has been estimated that the average number of external files referenced in a web page has reached about 50. It is estimated that an HTTP request has an average round-trip latency of 200 milliseconds. Thus, a web page with references to about 40 external files introduces a latency of about 4 seconds. The HTTP request-response latencies now dominate the web page response time to the extent that the actual download time to retrieve the web page and referenced external files is only about 15-20% of the total response time of the web page and 80-85% of the total response time of the web page is attributable to HTTP request-response latencies.

In light of the foregoing, there is a need in the art for a system and method to optimize the data communication between a web browser and a web server such as to facilitate a modular design approach, while reducing the requests generated by a web browser for retrieval of external files from the web server.

SUMMARY OF THE INVENTION

The system and method optimize data communication in a computational network. The computational network includes a server computational device and a client computational device. The server computational device stores one or more data objects.

A data object may be a container data object and an external data object. A container data object may include one or more references to one or more external data objects. A container data object may include a reference that refers to multiple external data objects.

In various embodiments, the client computational device may initiate a request to the server computational device to retrieve a container data object. If the container data object includes a reference to multiple external data objects, the client computational device may initiate a request to retrieve the multiple external data objects referenced in the container data object. The server computational device receives the request from the client computational device and provides a response including the external data objects. In an embodiment, the response is suitably compressed using one or more compression techniques to optimize network bandwidth utilization.

The present invention offers an improved system and method for data communication in a computational network. The number of requests generated by a client computational device during retrieval of a container data object along with a plurality of external data objects from the server computational device is significantly reduced. Further, a data object is suitably compressed before transmitting over the network and accordingly, the present invention facilitates optimum network bandwidth utilization.

BRIEF DESCRIPTION OF THE DRAWINGS

Various embodiments of the present invention will hereinafter be described in conjunction with the appended figures provided to illustrate and not to limit the present invention, wherein like reference numerals refer to identical or functionally similar elements throughout the separate views, and which, together with the detailed description below, are incorporated in and form part of the specification, and in which:

FIG. 4A is block diagram illustrating an exemplary programming code in a web page, in accordance with the prior art;

FIG. 4B is block diagram illustrating an exemplary programming code in a web page, in accordance with an embodiment;

DETAILED DESCRIPTION OF THE INVENTION

The detailed description of exemplary embodiments of the invention herein makes reference to the accompanying drawings, which show embodiments by way of illustration and best mode, and not of limitation. While these embodiments are described in sufficient detail to enable those skilled in the art to practice the invention, it should be understood that other embodiments may be realized and that logical and mechanical changes may be made without departing from the spirit and scope of the invention.

For the sake of brevity, conventional data networking, application development and other functional aspects of the systems (and components of the individual operating components of the systems) may not be described in detail herein.

Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a user interface (UI), a software module, logic engines, numerous databases and computer networks. While the system may contemplate upgrades or reconfigurations of existing processing systems, changes to existing databases and business information system tools are not necessarily required by the present invention.

The benefits provided by this invention include, for example, increased network performance, increased network bandwidth utilization, increased end-user functionality and increased end-user satisfaction. The increase in response time is estimated to be approximately fifty percent in some embodiments. This increase in response time enables a content provider to design client functionality with enhanced features and content, without degrading typical performance levels which leads to increased customer satisfaction.

Briefly, while the description references specific technologies, system architectures and data management techniques, practitioners will appreciate that this description is but one embodiment and that other devices and/or methods may be implemented without departing from the scope of the invention. Similarly, while the description may reference or imply a user interfacing with the system via a personal computer user interface, practitioners will appreciate that other interfaces may include mobile devices, kiosks and handheld devices such as personal digital assistants.

Figure 1:
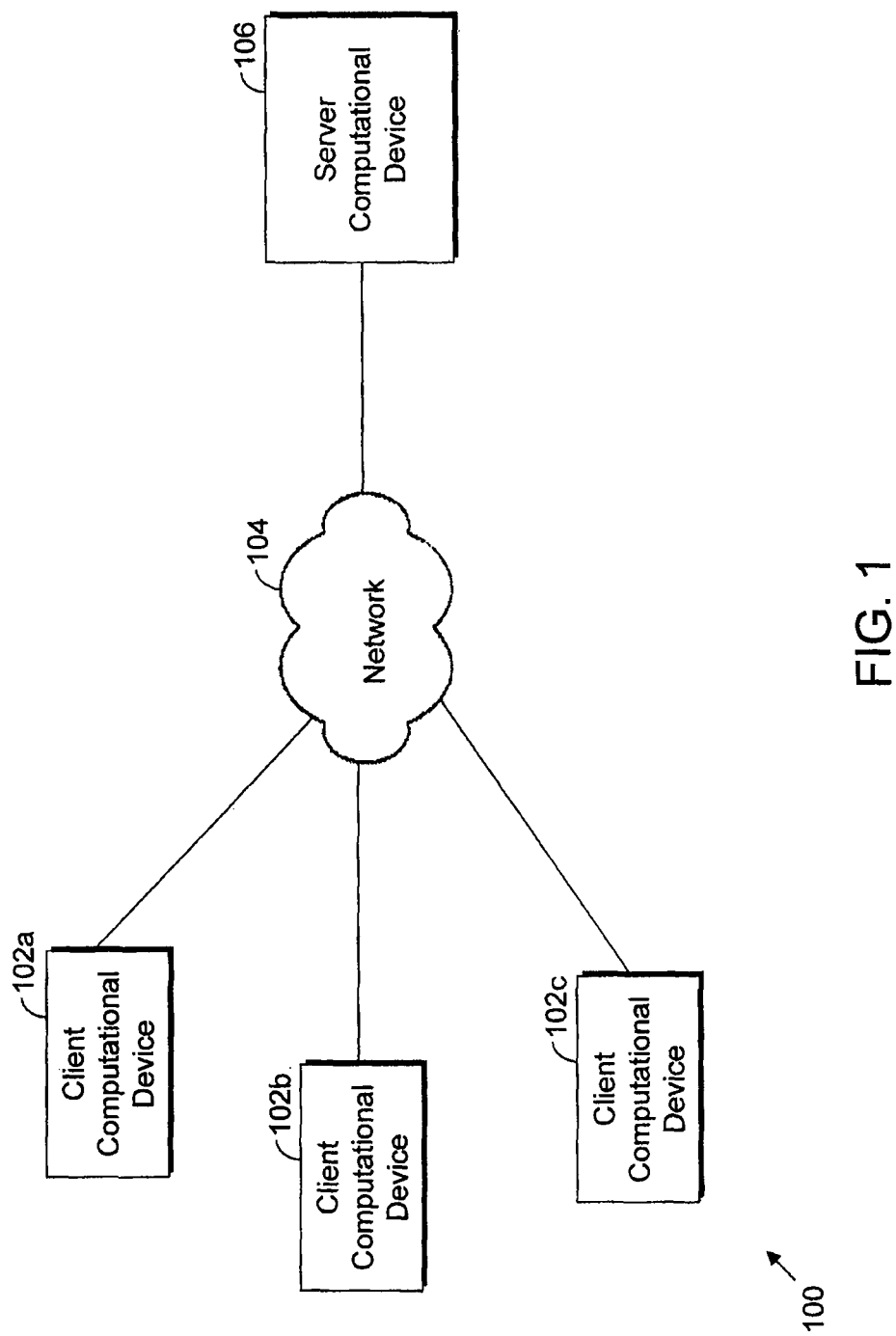
FIG. 1 is a block diagram illustrating a data communication system in a computational network, in accordance with an embodiment.

FIG. 1 is a block diagram illustrating a data communication system 100 in a computational network, in accordance with an embodiment. Data communication system 100 includes client computational devices 102*a*, 102*b*, and 102*c* (collectively referred to as client computational devices 102 and individually referred to as client computational device 102). Data communication system 100 further includes a network 104 and a server computational device 106.

Server computational device 106 stores one or more data objects. A data object may be one of a container data object and an external data object. A container data object may include one or more references to one or more external data objects. In an embodiment, at least one container data object includes a reference that refers to multiple external data objects.

Each server computational device 106 runs one or more server software applications that provide various services to client computational devices in data communication system 100. In various embodiments, server computational device 106 may be a server computer, for example, a blade-server computer, a rack-mounted server computer, an entry-level server computer, and so forth.

Network 104 is based on the Internet Protocol (IP). Network 104 may represent one or more networks segments, such as one or more internet segments, one or more intranets, and so forth. Network 104 may span over one or more physical networks, such as Public Switched Telephone Network (PSTN), Integrated Services Digital Network (ISDN), cellular network, and so on. Examples of network 104 include a Local Area Network (LAN), a Wide Area Network (WAN), a wireless network, other internet-enabled networks, the Internet, and so forth.

Each client computational device 102 runs a client software application that enables client computational device 102 to communicate with server computational device 106 using a set of standard data communication protocols to retrieve one or more container data objects along with one or more external data objects referenced in the one or more container data objects. In one embodiment, each client computational device 102 is a general-purpose computational device, for example, a personal computer, a laptop, a palmtop, a personal digital assistant (PDA), a mobile cellular device, an Internet appliance, or any such device that has the communication, processing and display capabilities for performing the present invention.

In various embodiments, data communication system 100 may be implemented in one of a variety of network architectures, such as, a 2-tier architecture (client-server architecture), a 3-tier architecture, an N-tier architecture, a peer-to-peer architecture, a tightly-coupled architecture, a service-oriented architecture, a mobile-code-based architecture, and a replicated-repository-based architecture.

In an embodiment, data communication system 100 is based on the World Wide Web, which is a wide area hypermedia information retrieval system which includes a large set of interlinked Hypertext documents accessed through the Internet. Accordingly, the client software application includes a web client, server computational device includes a web server along with a database, the container data object includes a web page, and the external data object includes one of script files, style sheets, image files, audio files, video files, and so forth. The system will hereinafter be described with reference to the client-server architecture of the Web. However, it should be noted that the present invention is equally applicable to any of the variety of architectures mentioned above.

Figure 2:
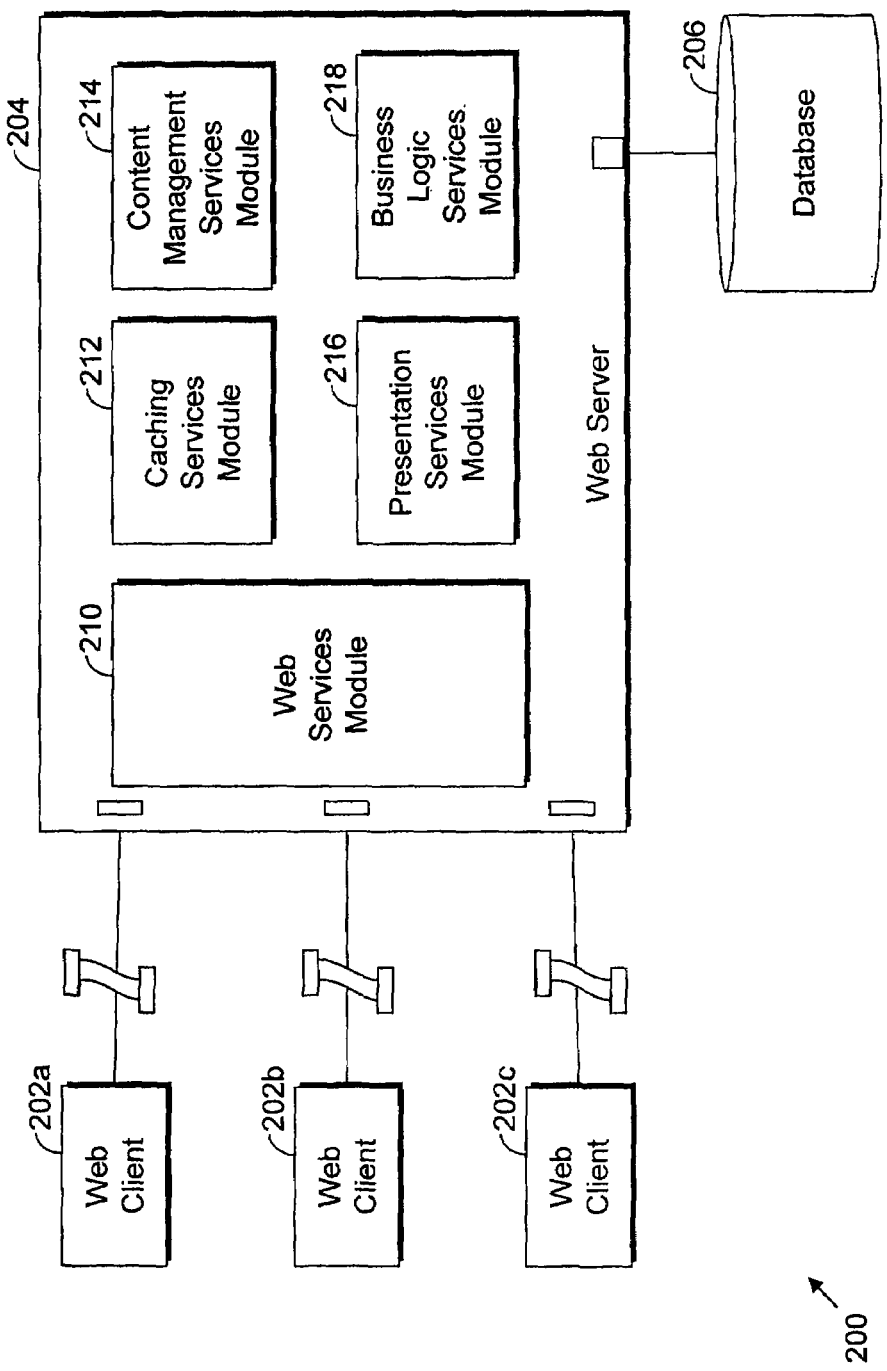
FIG. 2 is a block diagram illustrating a data communication system in accordance with the client-server architectural model of the World Wide Web, in accordance with an embodiment.

FIG. 2 is a block diagram illustrating a data communication system 200 in accordance with the client-server architectural model of the World Wide Web, in accordance with an embodiment. Data communication system 200 includes web clients 202a, 202b, and 202c (hereinafter collectively referred to as web clients 202 and individually referred to as web client 202). Data communication system 200 further includes a web server 204 and a database 206. Web server 204 includes a web services module 210, a caching services module 212, a content management services module 214, a presentation services module 216, and a business logic services module 218.

Each web client 202 is a client software application that communicates with web server 204 using a set of standard data communication protocols, such as Hypertext Transfer Protocol (HTTP), to retrieve one or more data objects. In accordance with an embodiment, web client 202 is a browser software application. Web client 202 may be any commonly available browsing software application or even a proprietary browsing software application. Web server 204 receives requests from web clients 202 for one or more data objects, and serves web clients 202 by providing responses including the one or more data objects. The one or more data objects are stored in database 206.

Web client 202 may include an operating system (e.g., Windows XP, Windows NT, 95/98/2000, XP, Vista, OS2, UNIX, Linux, Solaris, MacOS, Windows Mobile OS, Windows CE, Palm OS, Symbian OS, Blackberry OS, J2ME, etc.) as well as various conventional support software and drivers typically associated with mobile devices and/or computers. Web client 202 may be in any environment with access to any network, including both wireless and wired network connections. In an embodiment, access is through a network or the Internet through a commercially available web-browser software package. Web client 202 and other data communication system 100 components may be independently, separately or collectively suitably coupled to the network via data links which includes, for example, a connection to an Internet Service Provider (ISP) over the local loop as is typically used in connection with standard wireless communications networks and/or methods, modem communication, cable modem, Dish networks, ISDN, Digital Subscriber Line (DSL), see, e.g., Gilbert Held, Understanding Data Communications (1996). In an embodiment, any portion of web client 202 is partially or fully connected to a network using a wired ("hard wire") connection. As those skilled in the art will appreciate, web client 202 and/or any of the system components may include wired and/or wireless portions.

FIG. 1 depicts database 206 that is included in an exemplary embodiment. Database 206 provides a permanent memory location and may be implemented using any suitable database for storing the one or more data objects, for example, hierarchical databases, network databases, relational databases, entity databases, object databases, object-relational databases, and so on. Various examples of the data objects include web pages, script files, style sheets, image files, audio files, video files, and so forth. As practitioners will appreciate, while depicted as a single for the purposes of illustration, databases residing within data communication system 100 may be implemented as separate and/or independent entities and represent multiple hardware, software, database, data structure and networking components. Furthermore, embodiments are not limited to the exemplary databases described herein, nor do embodiments necessarily utilize each of the disclosed exemplary databases.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of data communication system 100 may consist of any combination thereof at a single location or at multiple locations, wherein each database or system includes any of various suitable security features, such as firewalls, access codes, encryption, decryption, compression, decompression, and/or the like.

A web page is an electronic document created using a mark-up language, such as Hypertext Mark-up Language (HTML), Extensible HTML (XHTML), Dynamic HTML (DHTML), and the like. A web page includes a perceived information set, which is rendered by web client 202. The perceived information set includes a textual information sub-set, a non-textual information sub-set, and an interactive information sub-set. Examples of non-textual information sub-set include static images, animated images, audio and video. The web page further includes an internal information set, which includes information that facilitates rendering of the web page and information that provides a set of functionalities to the web page. Examples of internal information set include style sheets, scripts, and meta-data. In various embodiments, a part of the perceived and internal information sets is stored in one or more files other than the web page. These files are referred to as external files associated with the web page. In one embodiment, the information related to a web page is included in one or more external files and the web page includes one or more references to the one or more external files.

In various embodiments, a web page is a container data object and the one or more external files are one or more external data objects. As a container data object, a web page includes one or more references to one or more external data objects, e.g., the external files. In an embodiment, a web page includes at least one reference that refers to multiple external files.

Web client 202 facilitates retrieval of a web page located on web server 204. In an embodiment, web client 202 includes a temporary memory location, which is referred to as a client-side cache. Web server 204 may indicate that a data object, such as a web page, one or more external files referenced by the web page, and so forth, provided to web client 202 may remain valid for a pre-defined time period. Accordingly, web client 202 may store the data object when the data object is retrieved from web server 204. Thus, a web page and one or more external files may be retrieved locally from the client-side cache instead of being retrieved from web server 204 when the web page is to be rendered again in the future.

Web server 204 associates an entity tag with each data object, such as a web page, an external file, and so on, to achieve version control and ensure that web client 202 renders the latest version of each data object. An entity tag is a string that uniquely defines a specific version of a data object. When a web client 202 stores a data object in the client-side cache, the data object is stored along with an associated entity tag.

Web server 204 serves the requests sent by web client 202 through one or more services modules illustrated in FIG. 2. Web services module 210 provides web listening services and handles various requests received by web server 204. Web services module 210 may process and serve the request. In one embodiment, web services module 210 may route a request to another services module for processing. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Content management services module 214 manages and provides access to the data objects, including the web pages and the external files, stored in database 206. Content management services module 214 provides services such as file searching, version control through check-in-check-out functionality, and so on.

Caching services module 212 manages a temporary memory location, for example, by caching frequently requested data objects in the temporary memory location. Caching services module 212 thereby reduces the load on database 206 and at the same time, improves the performance, scalability, and availability of web server 204.

Presentation services module 216 enables dynamic content generation, for example a dynamic web page, instead of a static web, to be rendered to web client 202. Various embodiments of the present invention are equally applicable to static web pages that are stored in database 206 and dynamic web pages that are created based on a request for a user.

Business logic services module 218 provides support for application logic to enable one or more web applications.

Figure 3:
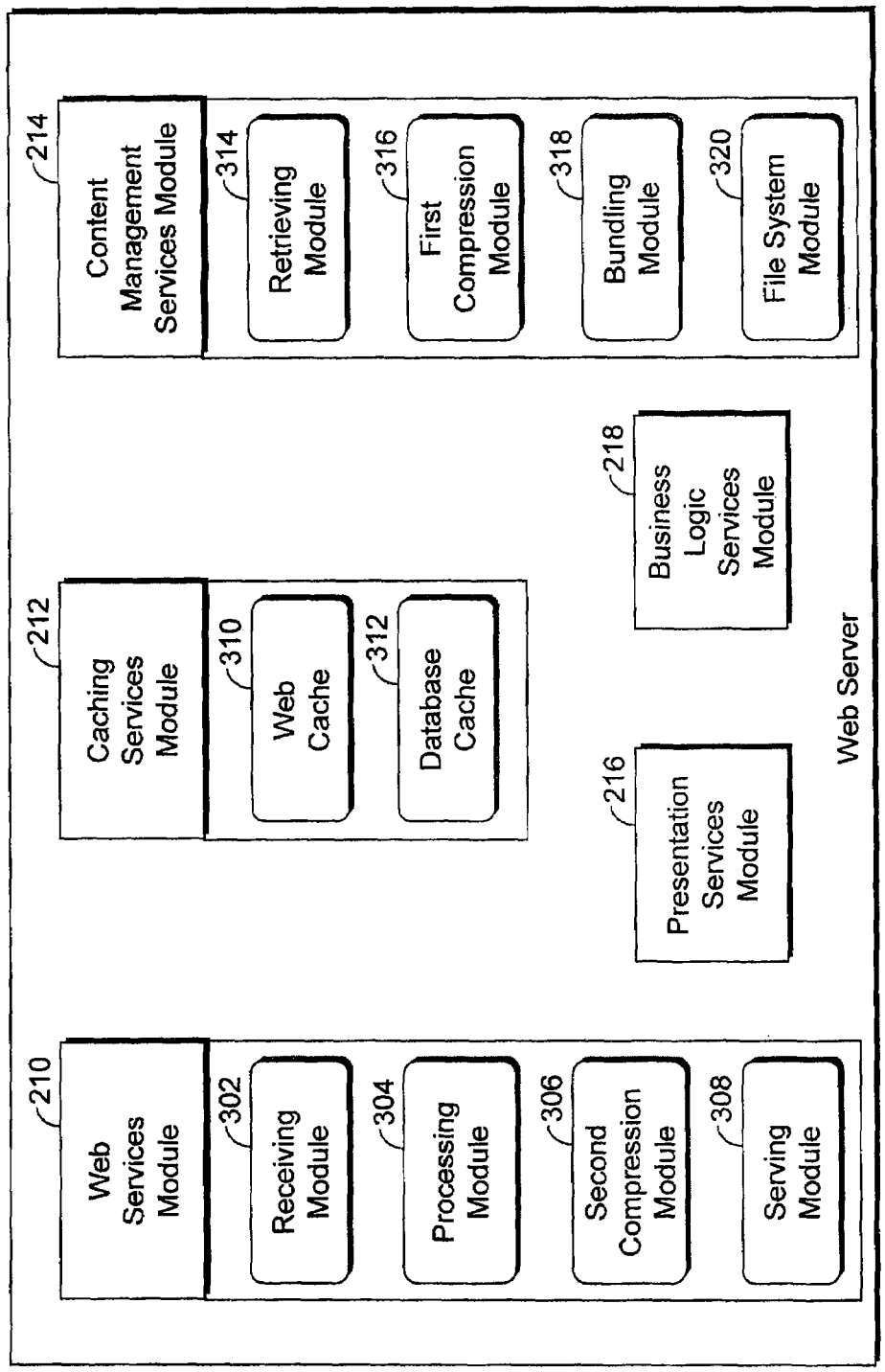
FIG. 3 is a block diagram illustrating a set of functional modules participating in serving a request for a data object, in accordance with an embodiment.

The features and functions of various service modules included in web server 204 are explained in detail with reference to FIG. 3. FIG. 3 is a block diagram illustrating a set of functional modules participating in serving a request for a data object, in accordance with an embodiment.

Web services module 210 includes a receiving module 302, a processing module 304, a second compression module 306, and a serving module 308. Caching services module 212 includes a web cache 310 and a database cache 312. Content management services module 214 includes a retrieving module 314, a first compression module 316, a bundling module 318, and a file system module 320.

Receiving module 302 receives one or more requests from web client 202. The requests include a request for a web page, a request for one or more external files, and so on.

Processing module 304 parses the request and routes the request to one or more modules in web server 204 for further processing. Processing module 304 receives the data from the one or more modules and prepares a response payload for the request. If the request indicates that web client 202 supports response compression, processing module 304 sends the response payload to second compression module 306. However, if the request indicates that web client 202 does not support response compression, processing module 304 sends the response payload to serving module 308.

Second compression module 306 compresses the response payload by applying a suitable compression algorithm. In an embodiment, a compression algorithm known as GNU Zip (gzip) based on deflate encoding method is applied to the response payload, thereby compressing the response payload before initiating transfer over the network.

Serving module 308 prepares a response to be provided to web client 202. The response includes a status code, a response header, and the response payload. In an embodiment, serving module 308 includes an instruction for web client 202 to store one or more data objects included in the response payload in the client-side cache at web client 202.

Web cache 310 provides a non-persistent memory for storing data objects that are frequently accessed by web client 202. Web cache 310 eliminates the need to repeatedly process requests on web server 204. In an embodiment, web cache stores static and dynamically generated data objects.

Database cache 312 provides a non-persistent memory for storing data objects that are frequently accessed by one or more services modules in web server 204, such as presentation services module 216, business logic services module 218, and the like.

Retrieving module 314 interfaces with database 206 and retrieves one or more data objects stored in database 206, based on requests received from a web server services module. For example, when retrieving module 314 receives a request for a static web page from processing module 304, it retrieves the static web page from database 206 and provides the web page to the processing module 304. In case, a data object retrieved by retrieving module 314 includes programming code, for example, a script file, retrieving module 314 sends the data object to first compression module 316.

First compression module 316 removes unnecessary characters from the programming code in a data object to reduce the size of the data object, in accordance with a process called minification. The unnecessary characters include comments, white space characters, and the like. The reduced size of the data object facilitates faster transfer of the data object to web client 202 over network 104.

File system module 320 manages the file system in database 206. File system module 320 provides services, such as uploading and deleting one or more data objects in database 206, and modifying file attributes such as expiration dates, and so on. When the multiple external data objects are bundled, file system module 320 stores the bundle in database 206 such that the bundle is regenerated only if one of the multiple external data objects is modified. In case any of the external data objects is modified, file system module 320 deletes the corresponding bundles from database 206. Further, file system module 320 instructs caching services module 212 to delete the corresponding bundle from web cache 310 and database cache 312.

In addition to the components described above, data communication system 100 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more data communication system 100 components may be embodied as a customization of an existing system, an add-on product, upgraded software, a stand-alone system (e.g., kiosk), a distributed system, a method, a data processing system, a device for data processing, and/or a computer program product. Accordingly, individual data communication system 100 components may take the form of an entirely software embodiment, an entirely hardware embodiment, or an embodiment combining aspects of both software and hardware. Furthermore, individual data communication system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, Flash, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall.

The system and method, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system includes a communication unit, which enables the computer to connect to other databases and the Internet through an I/O interface. The communication unit enables the transfer and reception of data from other databases and may include a modem, an Ethernet card, or any similar device, which enables the computer system to connect to databases and networks such as LAN, MAN, WAN and the Internet. The computer system facilitates inputs from a user through the input device that is accessible to the system through an I/O interface.

The computer system executes a set of instructions that are stored in one or more storage elements to process input data. The storage elements may also store data or other information, as desired, and may be in the form of an information source or a physical memory element present in the processing machine. Exemplary storage elements include a hard disk, a DRAM, an SRAM and an EPROM. Storage elements may also be external to the computer system, and be connected to or inserted into the computer, to be downloaded at or prior to the time of use. Examples of such external computer program products include computer-readable storage mediums such as CD-ROMS, flash chips, floppy disks, and the like.

Software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that directs a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Processing of input data by the processing machine may be in response to users' commands, to the result of previous processing, or in response to a request made by another processing machine. The modules described herein may include processors and program instructions that implement the functions of the modules described herein. Some or all the functions may be implemented by a state machine that has no stored program instructions, or in one or more application-specific integrated circuits (ASICs), in which each function or some combinations of certain of the functions are implemented as custom logic.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Referring again to the figures, the block system diagrams and process flow diagrams represent mere embodiments of the invention and are not intended to limit the scope of the invention as described herein. For example, the programming instructions and/or steps recited in FIGS. 4-6C may be executed in any order and are not limited to the order presented. It will be appreciated that the following description makes appropriate references not only to the steps depicted in FIGS. 4-6C, but also to the various system components as described above with reference to FIGS. 1-2.

Referring now to FIG. 1, client computational device 102 initiates a request to server computational device 106 to retrieve a container data object. After receiving the container data object, in case the container data object includes a reference to multiple external data objects, client computational device 102 initiates a request to retrieve the multiple external data objects referenced in the container data object. Server computational device 106 receives the request from client computational device 102 over network 104, and provides a response including the one or more data objects.

Referring now to FIG. 2, web client 202 facilitates retrieval of a web page located on web server 204. Web client 202 initiates a connection to web server 204 and sends a request for a web page. Web server 204 delivers the web page, in the form of a text document coded in a mark-up language as a part of a response to the request. Web client 202 parses the web page to determine whether one or more references, referring to one or more external files, are included in the web page. If a reference is included in the web page, web client 202 sends a request to web server 204 to retrieve the one or more external files. Web server 204 provides a response including the one or more external files.

In one embodiment, if the reference included in the web page refers to multiple external files, web server 204 combines the multiple external files to create a bundle, which is included in the response. The request from web client 202 and the response from web server 204 are communicated in accordance with a standard data transfer protocol such as HTTP. This process is repeated for each reference included in the web page. After receiving the web page and the one or more external files referenced in the web page, web client 202 displays the web page to an end user. The process of displaying a web page may be referred to as rendering.

In an embodiment, web client 202 receives compressed data objects from web server 204 and decompresses the data objects for rendering. Web client 202 indicates the ability to receive compressed data objects from web server 204. Web server 204 compresses a data object and prepares a response and also includes an indication in the response that the data object is compressed and should be uncompressed by web client 202.

While rendering a web page, if web client 202 determines that a reference is included in the web page, web client 202 searches in the client-side cache to determine if the one or more external files are stored in the client-side cache. In one embodiment, the reference refers to multiple external files and a bundle containing the multiple external files is searched. If web client 202 is able to identify the external file or the bundle containing the multiple external files in the client-side cache, web client 202 validates the external file or the bundle by sending the corresponding entity tag to web server 204. Thus if the entity tag of the data object stored in the client-side cache matches the entity tag of the data object stored on web server 204, web server 204 provides a response including an indication that the data object is valid and may be retrieved locally from the client-side cache. However, if the entity tag of the data object stored in the client-side cache does not match the entity of the data object stored on web server 204, web server 204 sends a response including the data object.

The following examples illustrate the functions of various functional modules (illustrated in FIGS. 103) participating in serving a request for a data object.

When web client 202 requests to retrieve multiple external data objects in a single request, retrieving module 314 retrieves the multiple external data objects and sends the multiple external data objects to bundling module 318, either directly or through first compression module 316, based on the type of the multiple external data objects. Bundling module 318 combines the multiple external data objects into a bundle and provides the bundle to processing module 304 to be included in the response to web client 202. When the multiple external data objects are bundled, the bundle is cached on the web server 204 such that the bundle is regenerated only if one of the multiple external data objects is modified.

Web client 202 sends a request to web server 204 for a web page stored in database 206. The web page includes a reference that refers to a bundle containing three script files.

Receiving module 302 receives the request from web client 202 and sends the request to processing module 304. Processing module 304 sends the request to caching services module 212 to search for the web page document in web cache 310. If the web page is present in web cache 310, the web page is provided to processing module 304. However, if the web page is not present in web cache 310, processing module 304 sends the request to retrieving module 314. Retrieving module 314 retrieves the web page from database 206 and sends the web page to processing module 304. Processing module 304 sends the web page to second compression module 306, which compresses the web page using gzip compression. Second compression module 306 sends the web page to serving module 308. In an embodiment, the web page is also provided to caching services module 212 to be cached in web cache 310. Serving module 308 prepares a response to be sent to web client 202.

Web client 202 receives the response from web server 204 and parses the web page before initiating the rendering process. Web client 202 identifies the reference included in the web page. Web client 202 searches a bundle containing the three script files in the client-side cache.

In case the bundle is stored in the client-side cache, the three script files are retrieved from the client-side cache. Web client 202 sends a request to provide the three script files along with the entity tag of the bundle retrieved from the client-side cache. Processing module 304 receives the request and sends a request to file system module 320 to validate the entity tag. In case the entity tag is valid (which implies that the version of the bundle stored in the client-side cache is identical to the version of the bundle stored in database 206), file system module 320 indicates the valid status of the entity tag to processing module 304. Processing module 304, in turn, prepares a response including a status code which indicates that the entity tag of the bundle stored in the client-side cache is valid and sends the response to web client 202. Web client 202 uses the three script files retrieved from the client-side cache while rendering the web page. In one embodiment, if the entity tag of the bundle is not valid, various functional modules interact to prepare a response payload including a bundle containing the three script files and sends a response including the response payload to web client 202.

In case the bundle is not stored in the client-side cache, web client 202 sends a request to web server 204 to provide the bundle corresponding to the reference. It is to be noted that web client 202 processes the reference to bundle containing three script files in the same manner as a reference to a single external file.

Receiving module 302 receives a request from web client 202 and sends the request to processing module 304. Processing module 304 sends the request to caching services module 212 to search for a bundle containing the three script files in web cache 310. If the bundle is present in web cache 310, the bundle is provided to processing module 304. However, if the bundle is not present in web cache 310, processing module 304 sends the request to retrieving module 314. Retrieving module 314 queries database 206 to retrieve the bundle. In case, the bundle is present in database 206, the bundle is retrieved and provided to processing module 304.

In case the bundle is not present in database 206, retrieving module 314 retrieves each of the three script files from database 206. The three script files are sent to first compression module 316, which compresses the script files in the manner described earlier. The three script files are then provided to bundling module 318. Bundling module 318 combines the three script files to create a bundle. The bundle is provided to processing module 304 and file system module 320. File system module 320 uploads the bundle in database 206 for subsequent requests for the bundle from web client 202.

Processing module 304 sends the bundle to second compression module 306, which compresses the bundle in the manner described earlier. Second compression module 306 sends the bundle to serving module 308. Serving module 308 prepares a response to be sent to web client 202. Serving module 308 also stores the bundle in web cache 310 for use in the future.

FIG. 4A is block diagram illustrating an exemplary programming code in web page 400. The exemplary programming code in web page 400 includes code blocks 402 and 404. Code block 402 includes three references, each reference referring to a respective style sheet to be included in web page 400. As shown in the figure, code block 402 references three style sheets namely, "home.css", "generic.css", and "navigation.css". The location of a style sheet is mentioned as the value of 'href' attribute of 'link' element. Similarly, code block 404 includes three references, each reference referring to a respective script file. As shown in the figure, code block 404 references three script files, namely, "prototype.js", "reflection.js", and "login.js". The location of a script file is mentioned as the value of 'src' attribute of 'script' element.

Each of code blocks 402 and 404 instruct web client 202 to send three requests to web server 204 for providing the external files referenced in the code block during the process of rendering web page 400. The total count of requests sent by web client 202 for retrieving a total of six external files (three style sheets and three script files) is six.

FIG. 4B is block diagram illustrating an exemplary programming code in web page 400, in accordance with an embodiment. The exemplary programming code in web page 400 includes code blocks 406 and 408. Code block 406 includes a reference that refers to three style sheets to be included in web page 400. As shown in the figure, the reference refers to three style sheets namely, "home.css", "generic.css", and "navigation.css". Similarly, code block 408 includes a reference referring to three script files. As shown in the figure, the reference refers to three script files, namely, "prototype.js", "reflection.js", and "login.js".

Code block 406 instructs web client 202 to send a request to web server 204 to retrieve corresponding style sheets. At web server 204, the value of 'href' attribute of 'link' element is interpreted and a corresponding bundle, which contains the three style sheets, is located and provided to web client 202. In case, the corresponding bundle does not exist, the three style sheets are retrieved from the database and the corresponding bundle is created and provided to web client 202.

Similarly, code block 408 instructs web client 202 to send a request to web server 204 to retrieve corresponding script files. At web server 204, the value of 'src' attribute of 'script' element is interpreted and a corresponding bundle, which contains the three script files, is located and provided to web client 202. In case the corresponding bundle does not exist, the three script files are retrieved from the database and the corresponding bundle is created and provided to web client 202. In one embodiment, the value of 'src' attribute of 'script' element is processed by a servlet at the server computational device which will accept three parameters namely, file, filetype and page. The page parameter is used to indicate whether page personalization should occur (e.g., pages may need to be personalized depending upon the geographic location of the request).

The total count of requests sent by web client 202 for retrieving a total of six external files (three style sheets and three script files) is two.

It should be noted that any number of references to files of one type may be combined into a single reference in the same manner as illustrated above.

Figure 5:
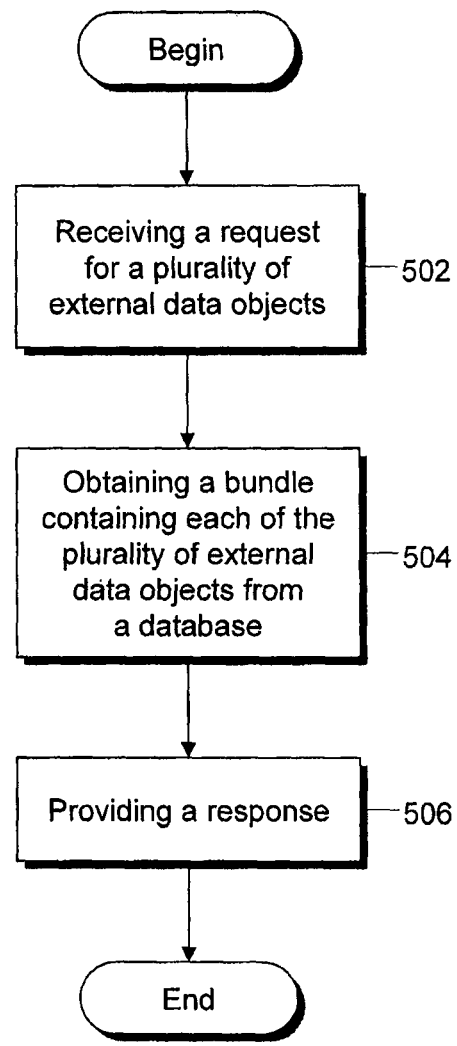
FIG. 5 is a flow diagram illustrating an exemplary method for optimizing data communication in the computational network, in accordance with an embodiment.

FIG. 5 is a flow diagram illustrating an exemplary method for optimizing data communication in the computational network, in accordance with an embodiment. At step 502, a request for providing multiple data objects is received at a server computational device from a client computational device. The request is parsed and the multiple data objects are identified. At step 504, a bundle containing the multiple data objects is obtained from a database in the server computational device. The bundle may be already stored in the database and is directly retrieved. In one embodiment, the individual files are retrieved and a bundle is created by combining the multiple data objects. At step 506, a response is prepared and provided to the client computational device. In accordance with various embodiments of the present invention, the response may or may not include the bundle.

Figure 6A:
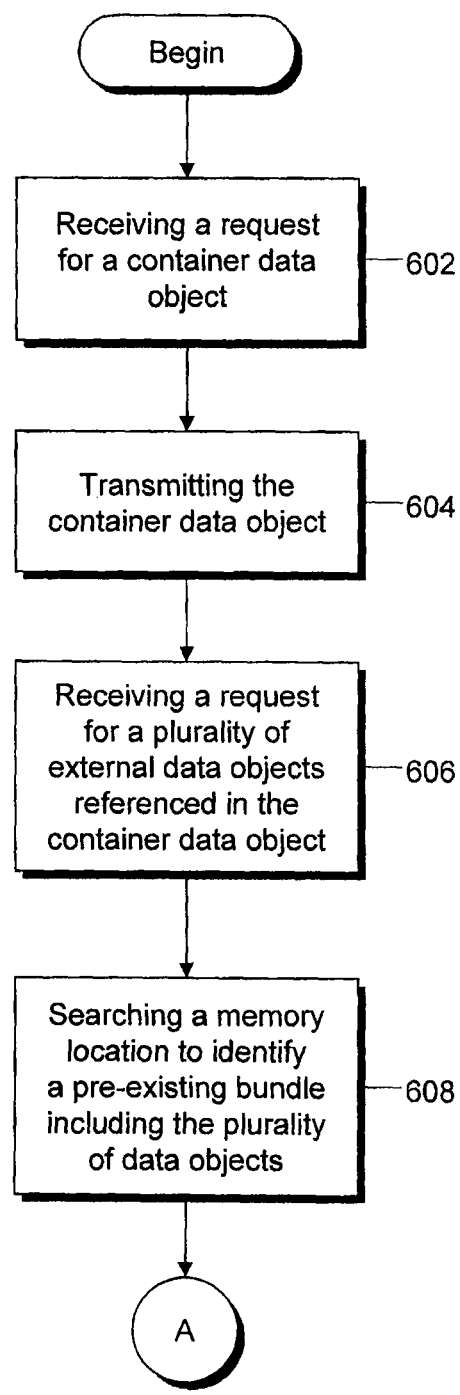
FIGS. 6A, 6B, and 6C are a flow diagram illustrating an exemplary method for optimizing data communication in the computational network, in accordance with another embodiment.
Figure 6B:
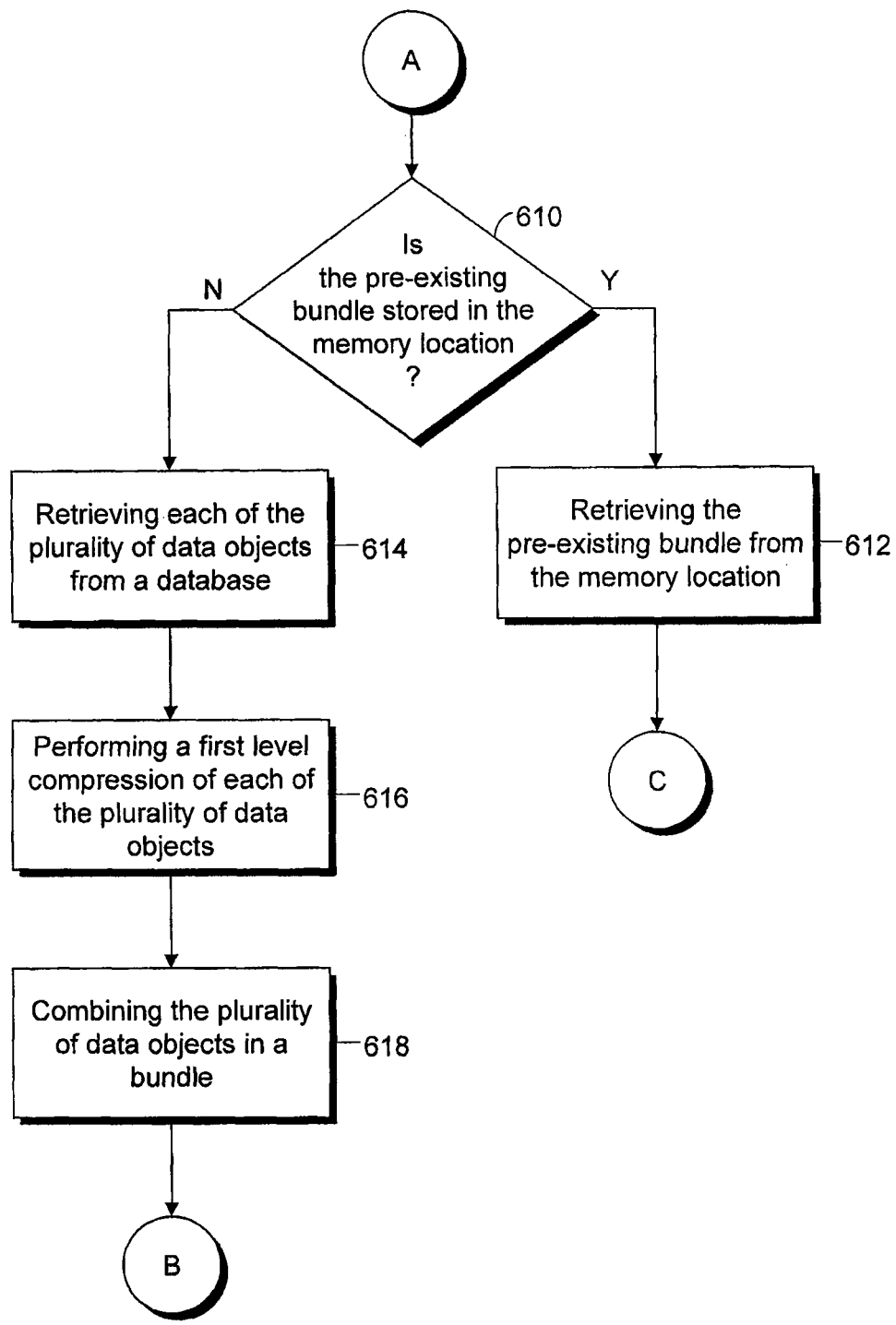
Figure 6C:
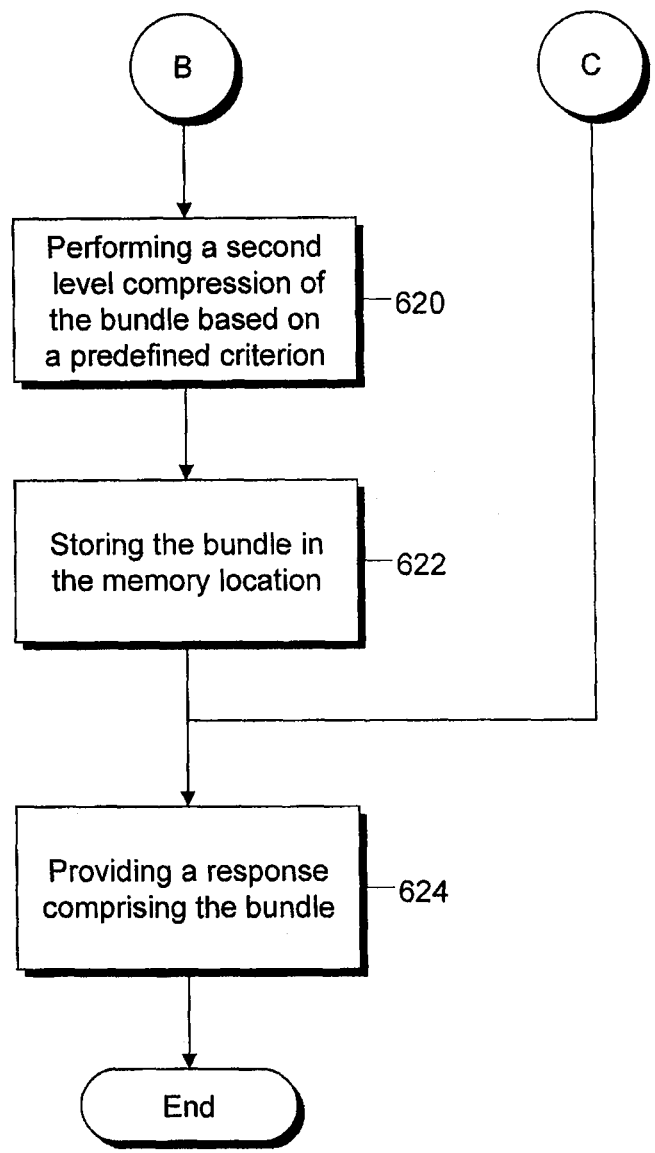

FIGS. 6A, 6B, and 6C are a flow diagram illustrating an exemplary method for optimizing data communication in the computational network, in accordance with another embodiment. At step 602, a request for a container object, such as a web page, is received at a server computational device. At step 604, the container object is provided to the client computational device as a part of the response to the request. The container data object is processed at the client computational device to determine whether one or more references, referring to one or more external data objects are included in the container data object. If a reference is included in the container data object, then the client computational device sends a request to the server computational device to retrieve the one or more external data objects.

At step 606, a request for one or more data objects is received at the server computational device from the client computational device. In an embodiment, during rendering of a web page, a web client identifies a reference to one or more external files and sends a request to retrieve the one or more external files to a web server. The web server parses the request and determines whether the request references a single external file or multiple external data objects. In case, the request references multiple external data objects, the request is interpreted to identify each of the multiple external data objects.

At step 608, a memory location is searched to determine if a bundle containing the multiple external data objects is stored in the memory location. In accordance with various embodiments of the present invention, the memory location may be a temporary memory location, such as server cache, and a permanent memory location, such as a database included in the server computational device. In an embodiment, initially the temporary memory location is searched and subsequently, the permanent memory location is searched.

At step 610, it is determined if the bundle is stored in the memory location. In case the bundle is stored in the memory location, the bundle is retrieved from the memory location at step 612 and subsequently, step 624 is performed. However, if the bundle is not stored in the memory location then, at step 614, each of the multiple external data objects is individually retrieved from the database.

At step 616, each external data object is compressed in accordance with a first compression algorithm. During compression using the first compression algorithm, unnecessary characters from programming code included in the external data object is removed to reduce the size of the external data object. The unnecessary characters include comments, white space characters, and the like. The reduced size of the external data object facilitates faster transfer of the external data object to the web client.

At step 618, the multiple external data objects are combined to create a bundle. Further, the bundle is assigned an entity tag, which is an identifier that uniquely identifies a version of the bundle.

At step 620, if the request indicates that the web client has the ability to decompress data objects compressed using a second compression algorithm, the bundle is compressed in accordance with the second compression algorithm, such as a compression algorithm known as GNU Zip (gzip), which is based on deflate encoding and the like.

At step 622, the bundle is stored in a memory location. In an embodiment, the bundle is stored at both the temporary memory location and the persistent memory location. At step 624, a response, including the bundle is prepared and provided to the web client. The response includes an instruction for the web client to cache the bundle for a predefined time period.

The present invention, as described herein, offers an improved system and method for data communication in a computational network. The number of requests generated by a client computational device to a server computational device when the client computational device retrieves a container data object, along with a plurality of external data objects referenced in the container data object, from the server computational device is significantly reduced. Further, the data objects are suitably compressed before transmitting over the network and accordingly, the present invention facilitates optimum network bandwidth utilization.

Thus, the present invention facilitates the web designers to adopt a modular approach while designing a web page. The modular approach helps to maintain a distinction between content, functionality, and appearance, and in turn, leads to reusability of code, facile testing and debugging, easier maintenance, and effective change management. At same time, the response time of the web page is significantly reduced and thus, the performance of the computational network is optimized.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed.

While the steps outlined above represent specific embodiments of the invention, practitioners will appreciate that there are any number of computing algorithms and user interfaces that may be applied to create similar results. The steps are presented for the sake of explanation only and are not intended to limit the scope of the invention in any way.

The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A computer implemented method comprising:
receiving, by a data communication server computer and from a client computational device, a request for a plurality of external data objects, wherein the data communication server computer comprises a container data object with a reference to the plurality of external data objects, wherein the request comprises a client-side entity tag uniquely identifying a first version of a bundle, and wherein the first version of the bundle comprises the plurality of external data objects and is stored in a temporary memory location in the client computational device;
determining, by the data communication server computer, whether the client-side entity tag is associated with a server entity tag; and
in response to the client-side entity tag being associated with the server entity tag:
transmitting, by the data communication server computer, a response indicating that the bundle may be retrieved from the client computational device; otherwise
in response to the client-side entity tag not being associated with the server entity tag:
retrieving, by the data communication server computer, the plurality of external data objects from a database;
performing, by the data communication server computer, a first level compression on the plurality of external data objects;
creating, by the data communication server computer, a second version of the bundle comprising the plurality of external data objects;
performing, by the data communication server computer, a second level compression on the second version of the bundle; and
transmitting, by the data communication server computer, a response comprising the second version of the bundle to the client computational device, wherein the response comprises the server entity tag and a status code indicating a valid status of the server entity tag, wherein the server entity tag uniquely identifies the second version of the bundle.

2. The method according to claim 1, wherein the retrieving the plurality of external data objects comprises searching a memory location for the bundle based upon the plurality of external data objects, the memory location comprising at least one of a temporary memory location or a permanent memory location.

3. The method according to claim 2, further comprising storing, by the data communication server computer, the bundle in a temporary memory location.

4. The method according to claim 1, further comprising retrieving, by the data communication server computer, each of the plurality of external data objects.

5. The method according to claim 4, further comprising performing, by the data communication server computer, a first level compression of each of the plurality of external data objects.

6. The method according to claim 4, further comprising performing, by the data communication server computer, a second level compression of the bundle based on a predefined criterion.

7. The method according to claim 4, further comprising storing, by the data communication server computer, the second version of the bundle in a memory location, the memory location comprising at least one of a temporary memory location or a permanent memory location.

8. The method according to claim 4, further comprising associating, by the data communication server computer, the server entity tag with the bundle, wherein the server entity tag is an identifier uniquely identifying a version of the bundle.

9. The method according to claim 1, wherein the response comprises the second version of the bundle and the server entity tag, wherein the server entity tag is an identifier uniquely identifying a version of the bundle.

10. The method according to claim 1, wherein the response comprises an instruction for the client computational device to store the second version of the bundle in a temporary memory location for a predefined interval of time.

11. A system, comprising:
a processor for data communication,
a tangible, non-transitory memory configured to communicate with the processor,
the tangible, non-transitory memory having instructions stored thereon that, in response to execution by the processor, cause the processor to perform operations comprising:
connecting, by the processor, to a computational network, wherein the processor comprises a container data object with a plurality of external data objects:
receiving, by the processor and from a client computational device, a request for the plurality of external data objects, wherein the request comprises a client-side entity tag uniquely identifying a first version of a bundle, and wherein the first version of the bundle comprises the plurality of external data objects and is stored in a temporary memory location in the client computational device;
determining, by the processor, whether the client-side entity tag is associated with a server entity tag; and
in response to the client-side entity tag being associated with the server entity tag:
transmitting, by the processor, a response indicating that the bundle may be retrieved from the client computational device; otherwise
in response to the client-side entity tag not being associated with the server entity tag:
retrieving, by the processor, the plurality of external data objects from a database based upon the request; and
performing, by the processor, a first level compression on the plurality of external data objects;
creating, by the processor, a second version of the bundle comprising the plurality of external data objects;
performing, by the processor, a second level compression on the second version of the bundle; and
transmitting, by the processor, a response comprising the second version of the bundle to the client computational device, wherein the response comprises the server entity tag and a status code indicating a valid status of the server entity tag, wherein the server entity tag uniquely identifies the second version of the bundle.

12. The data communication system according to claim 11, further comprising a retrieving module for retrieving each of the plurality of external data objects; and a bundling module for combining the plurality of external data objects to generate a bundle.

13. The data communication system according to claim 12, wherein the bundling module associates the server entity tag with the bundle, wherein the server entity tag is an identifier uniquely identifying a version of the bundle.

14. The data communication system according to claim 12, further comprising a first compression module to perform a first level compression of each of the plurality of external data objects.

15. The data communication system according to claim 12, further comprising a second compression module to perform a second level compression of the bundle based on a predefined criterion.

16. The data communication system according to claim 12, further comprising a memory location for storing the bundle, the memory location comprising at least one of a temporary memory location or a permanent memory location.

17. The data communication system according to claim 11, wherein the request for the plurality of external objects comprises the client-side entity tag of a stored bundle comprising the plurality of external objects, wherein the client-side entity tag is an identifier uniquely identifying a version of the stored bundle, and wherein the stored bundle is stored in a temporary memory location in the client computational device.

18. The data communication system according to claim 11, wherein the response comprises a status code indicating a valid status of the server entity tag of a stored bundle comprising the plurality of external objects, wherein the client-side entity tag included in the request is an identifier uniquely identifying a version of the stored bundle, and wherein the stored bundle is stored in a temporary memory location in the client computational device.

19. The data communication system according to claim 12, wherein the response comprises an instruction for the client computational device to store the second version of the bundle in a temporary memory location for a predefined interval of time.

20. An article of manufacture including a tangible, non-transitory computer-readable storage medium having instructions stored thereon that, in response to execution by a data communications server computer, cause the computer to perform operations, comprising:

receiving, by the data communication server computer and from a client computational device, a request for a plurality of external data objects, wherein the data communication server computer comprises a container data object with a reference to the plurality of external data objects, wherein the request comprises a client-side entity tag uniquely identifying a first version of a bundle, and wherein the first version of the bundle comprises the plurality of external data objects and is stored in a temporary memory location in the client computational device;

determining, by the data communication server computer, whether the client-side entity tag is associated with a server entity tag; and in response to the client-side entity tag being associated with the server entity tag:
transmitting, by the data communication server computer, a response indicating that the bundle may be retrieved from the client computational device; otherwise in response to the client-side entity tag not being associated with the server entity tag:
retrieving, by the data communication server computer, the plurality of external data objects from a database;
performing, by the data communication server computer, a first level compression on the plurality of external data objects;
creating, by the data communication server computer, a second version of the bundle comprising the plurality of external data objects;
performing, by the data communication server computer, a second level compression on the second version of the bundle; and transmitting, by the data communication server computer, a response comprising the second version of the bundle to the client computational device, wherein the response comprises the server entity tag and a status code indicating a valid status of the server entity tag, wherein the server entity tag uniquely identifies the second version of the bundle.

* * * * *